United States Patent
Frey, Jr.

(10) Patent No.: US 6,922,688 B1
(45) Date of Patent: Jul. 26, 2005

(54) COMPUTER SYSTEM STORAGE

(75) Inventor: Alexander H. Frey, Jr., Wayzatta, MN (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/261,708

(22) Filed: Mar. 3, 1999

Related U.S. Application Data

(63) Continuation-in-part of application No. 09/012,267, filed on Jan. 23, 1998, now Pat. No. 6,029,168.

(51) Int. Cl.$^7$ ............................................. G06F 17/30
(52) U.S. Cl. ............................. 707/2; 707/201; 707/10; 711/4; 711/114; 709/316
(58) Field of Search ........................ 707/1–201; 711/4, 711/114, 207, 147, 170; 709/316

(56) References Cited

U.S. PATENT DOCUMENTS

| | | | |
|---|---|---|---|
| 4,633,245 A | | 12/1986 | Blount et al. |
| 4,766,537 A | * | 8/1988 | Zolnowsky ................. 711/163 |
| 5,001,628 A | | 3/1991 | Johnson et al. |
| 5,113,519 A | | 5/1992 | Johnson et al. |
| 5,130,992 A | | 7/1992 | Frey, Jr. et al. |
| 5,327,553 A | | 7/1994 | Jewett et al. |
| 5,454,103 A | * | 9/1995 | Coverston et al. .......... 711/170 |
| 5,465,365 A | * | 11/1995 | Winterbottom ............. 707/101 |
| 5,497,457 A | | 3/1996 | Ford |
| 5,511,177 A | | 4/1996 | Kagimasa et al. |
| 5,513,314 A | | 4/1996 | Kandasamy et al. |
| 5,513,459 A | | 5/1996 | Schneider |
| 5,519,844 A | * | 5/1996 | Stallmo ....................... 711/114 |
| 5,522,032 A | | 5/1996 | Franaszek et al. |
| 5,524,205 A | | 6/1996 | Lomet et al. |
| 5,594,903 A | * | 1/1997 | Bunnell et al. ............. 717/162 |
| 5,603,011 A | * | 2/1997 | Piazza ........................ 711/170 |
| 5,684,974 A | * | 11/1997 | Onodera .................... 711/202 |
| 5,689,701 A | * | 11/1997 | Ault et al. .................. 707/200 |
| 5,692,178 A | | 11/1997 | Shaughnessy |
| 5,701,462 A | * | 12/1997 | Whitney et al. .............. 707/10 |
| 5,724,512 A | * | 3/1998 | Winterbottom .............. 707/10 |
| 5,734,861 A | * | 3/1998 | Cohn et al. ................. 711/134 |
| 5,751,928 A | | 5/1998 | Bakalash |
| 5,758,118 A | * | 5/1998 | Choy et al. ................. 711/114 |
| 5,771,379 A | * | 6/1998 | Gore, Jr. .................... 707/101 |

(Continued)

FOREIGN PATENT DOCUMENTS

| | | |
|---|---|---|
| WO | WO 97/22054 | 6/1997 |
| WO | WO 99/09479 | 2/1999 |

OTHER PUBLICATIONS

"The Zebra Striped Network File System," Hartman et al., ACM Transactions on Computer Systems, vol. 13, No. 3, 1995, pp. 274–310.

"Serverless Network File Systems," Anderson et al., ACM Transactions on Computer Systems, vol. 14, No. 1, 1996, pp. 41–79.

*Primary Examiner*—John Breene
*Assistant Examiner*—Anh Ly
(74) *Attorney, Agent, or Firm*—Martine & Penilla, LLP

(57) ABSTRACT

A method to access an object in a computer system storage includes receiving a reference to the object, obtaining a referential map based on the reference (the referential map indicating a plurality of logical storage locations), each logical storage location associated with a portion of the object, and obtaining a physical map that is independent of the referential map from one of the logical storage locations indicated in the referential map, the physical map indicating a physical storage location of at least a part of that portion of the object being accessed. Computer storage systems providing distributed storage in accordance with this method and methods storage media having instructions to perform the method are also described.

26 Claims, 7 Drawing Sheets

U.S. PATENT DOCUMENTS

| | | | | |
|---|---|---|---|---|
| 5,778,384 A | * | 7/1998 | Provino et al. | 707/200 |
| 5,842,214 A | * | 11/1998 | Whitney et al. | 707/10 |
| 5,875,444 A | * | 2/1999 | Hughes | 707/2 |
| 5,890,156 A | * | 3/1999 | Rekieta et al. | 707/10 |
| 5,897,661 A | * | 4/1999 | Baranovsky et al. | 707/205 |
| 5,918,229 A | * | 6/1999 | Davis et al. | 707/10 |
| 5,924,126 A | * | 7/1999 | Rosenthal et al. | 711/207 |
| 5,983,233 A | * | 11/1999 | Potonniee | 707/103 R |
| 5,987,506 A | * | 11/1999 | Carter et al. | 709/213 |
| 6,009,478 A | * | 12/1999 | Panner et al. | 707/1 |
| 6,026,414 A | * | 2/2000 | Anglin | 707/10 |
| 6,029,168 A | * | 2/2000 | Frey | 707/10 |
| 6,067,545 A | * | 5/2000 | Wolff | 707/10 |
| 6,105,103 A | * | 8/2000 | Courtright et al. | 711/1 |
| 6,119,131 A | * | 9/2000 | Cabrera et al. | 707/200 |
| 6,144,999 A | * | 11/2000 | Khalidi et al. | 709/219 |
| 6,154,854 A | * | 11/2000 | Stallmo | 711/114 |
| 6,161,097 A | * | 12/2000 | Glass et al. | 705/6 |
| 6,189,147 B1 | * | 2/2001 | Davis | 717/175 |
| 6,256,031 B1 | * | 7/2001 | Meijer et al. | 707/205 |
| 6,314,501 B1 | * | 11/2001 | Gulick et al. | 711/153 |
| 6,353,878 B1 | * | 3/2002 | Dunham | 707/202 |
| 6,366,987 B1 | * | 4/2002 | Tzelnic et al. | 711/162 |
| 6,385,625 B1 | * | 5/2002 | Slaughter | 707/202 |
| 6,389,427 B1 | * | 5/2002 | Faulkner | 707/104.1 |
| 6,421,684 B1 | * | 7/2002 | Cabrera et al. | 707/202 |
| 6,449,731 B1 | * | 9/2002 | Frey, Jr. | 707/202 |
| 6,530,036 B1 | * | 3/2003 | Frey, Jr. | 707/202 |
| 6,681,303 B1 | * | 1/2004 | Watanabe et al. | 711/162 |

\* cited by examiner

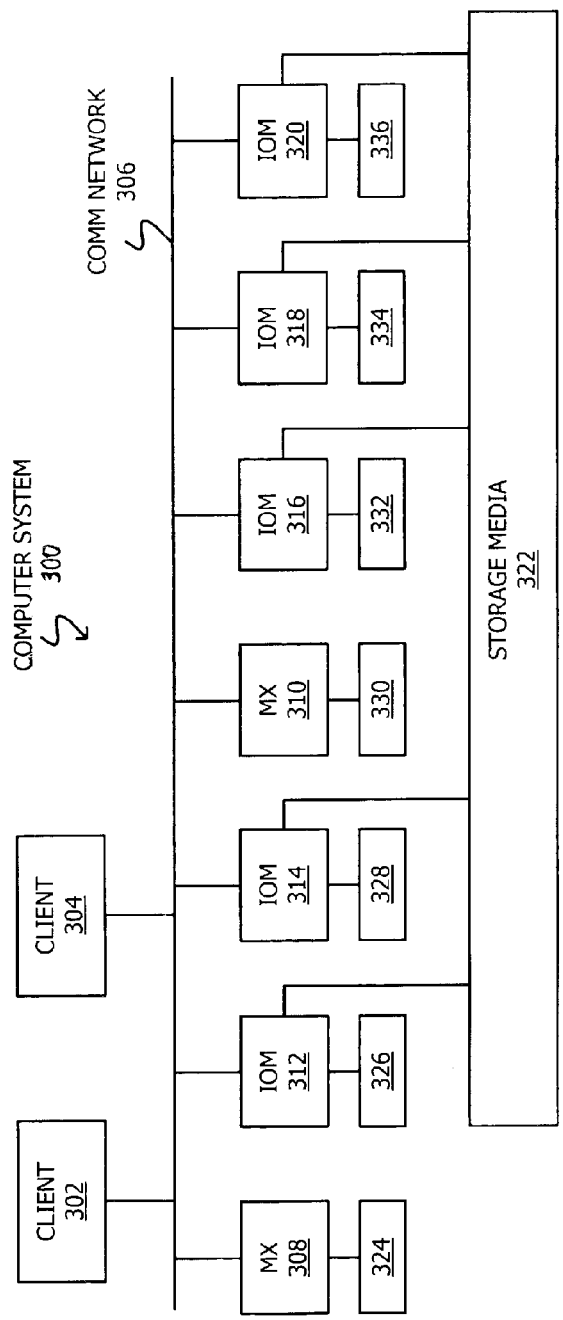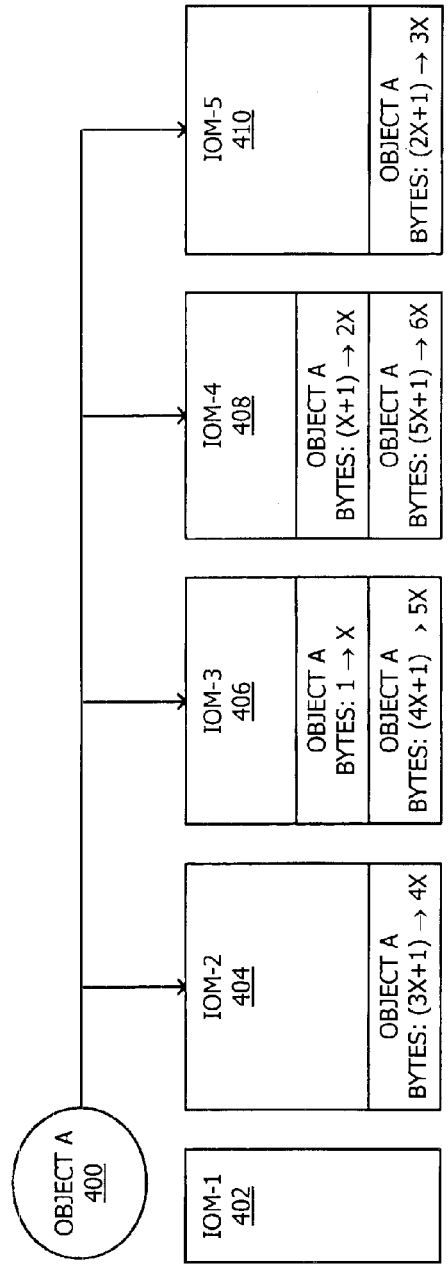

COMPUTER SYSTEM STORAGE

This is a continuation-in-part of U.S. Ser. No. 09/012,267, filed Jan. 23, 1998, now U.S. Pat. No. 6,029,168.

BACKGROUND

The invention relates generally to computer system storage and more particularly to mechanisms (methods and devices) for providing distributed computer system storage.

It is common for organizations to employ large numbers of computers for tasks such as data storage. Typically, some or all of an organization's computers may be interconnected to form a network whereby two computer systems are interconnected so that they are capable of exchanging information. With the adoption of computer network technology came the desire for increased storage capacity. Increased storage capacity, in turn, led to a need to distribute filesystems across networked computers. In general, distribution of file systems is done by software applications that keep track of files stored across a network. One goal of distributing filesystems is to allow a user/application of one computer (or node) in a computer network to access data or an application stored on another node in the computer network. Another goal of distributing file systems is to make this access transparent with respect to the stored object's physical location.

FIG. 1 shows a computer system employing distributed file system technology in accordance with the prior art. As shown, node-A 100 and node-B 102 are interconnected by communication link 104. Illustrative nodes include specialized or general purpose workstations and personal computers. An illustrative communication link employs coaxial or twisted pair cable and the transport control protocol (TCP). Each node A and B executes a local version of a distributed filesystem, 106 and 108 respectively. Each distributed filesystem manages the storage of objects to/from a storage unit (e.g., 110 and 112), each of which may include one or more storage devices. Illustrative storage devices include magnetic disks (fixed, floppy, and removable) and optical media such as CD-ROM disks.

One well known distributed file system is the Network File System (NFS®) from Sun Microsystems, Incorporated of Palo Alto, Calif. In NFS, a server node may make its filesystem (in part or in whole) shareable through a process known as "exporting." A client node may gain access to an exported file system through a process known as "mounting." Exporting entails specifying those filesystems, or parts thereof, that are to be made available to other nodes (typically through NFS map files). Mounting adds exported filesystems to the file structure of a client node at a specified location. Together, the processes of exporting and importing define the filesystem namespace.

For example, consider FIG. 2 in which node 200 has local filesystem 202 including directories X, Y, and Z, and node 204 has local filesystem 206 including directories α, β, and γ. If node 204 exports, and node 200 imports filesystem 206 (often referred to as cross-mounting), node 200 may have combined system namespace 208. From directory structure 208, a user/application on node 200 may access any data object in remote directories α, β, and γ as if α, β, and γ were local directories such as X or Y.

One significant feature of distributed storage such as that illustrated in FIG. 2, is that all references to an object stored in directory a by a user at node 200 (i.e., through combined filesystem namespace 208) are resolved by the filesystem local to and executing on node 204. That is, the translation of an object's reference to the physical location of that object is performed by the file system executing on node 204. Another significant feature of current distributed file systems such as NFS® is that the processes of exporting and importing must be performed for each new directory to be shared. Yet another significant feature of current distributed file systems is that shared storage (e.g., mount points α, β, and γ) appear as discrete volumes or nodes in filesystem namespace. In other words, an exported filesystem (or part thereof) appears as a discrete objects of storage in the namespace of each importing node. Thus, system namespace is fragmented across multiple storage nodes. To export a single directory from a node to all other nodes in a computer network, not only must the exporting node's map of objects (or its equivalent) be updated to specify the directory being exported, but every node wanting to import that directory must have its map of objects updated. This may happen frequently as, for example, when additional storage is added via a new storage node being attached to the network, and requires significant administrative overhead for each such occurrence.

Thus, it would be beneficial to provide a distributed storage mechanism that reduces administrative overhead associated with sharing memory and unifies the shared system namespace.

SUMMARY

In one embodiment the invention provides a method to access an object in a computer system storage. The method includes receiving a reference to the object, obtaining a referential map based on the reference (the referential map indicating a plurality of logical storage locations), each logical storage location associated with a portion of the object, and obtaining a physical map that is independent of the referential map from one of the logical storage locations indicated in the referential map, the physical map indicating a physical storage location for that part or parts of the object associated with the logical storage unit from which the map was obtained. Methods in accordance with the invention may be stored in any media that is readable and executable by a programmable control device.

In another embodiment, the invention provides a computer storage system including a communication link, a client, a command translator to receive a memory access command from the client and to store one or more referential maps, each indicating a plurality of logical storage locations, and a plurality of logical storage locations. Each logical storage location stores one or more physical maps (independent of the referential maps). Each physical map indicating one or more physical locations where at least a part of an object is physically stored.

In yet another embodiment, a memory for storing data for access by a software routine includes a data structure having a primary object metadata structure, where each entry in the primary object metadata structure associates an object reference with a physical map if an initial part of the associated object is stored in the memory, and a secondary object metadata structure having a plurality of entries, each secondary object metadata structure entry associating an object reference with a physical map if an initial part of the associated object is not stored in the memory.

BRIEF DESCRIPTION OF THE DRAWINGS

FIG. 3 shows a computer system having distributed system storage in accordance with one embodiment of the invention.

FIG. 4 shows a referential mapping of an object in accordance with one embodiment of the invention.

DETAILED DESCRIPTION

Figure 1:
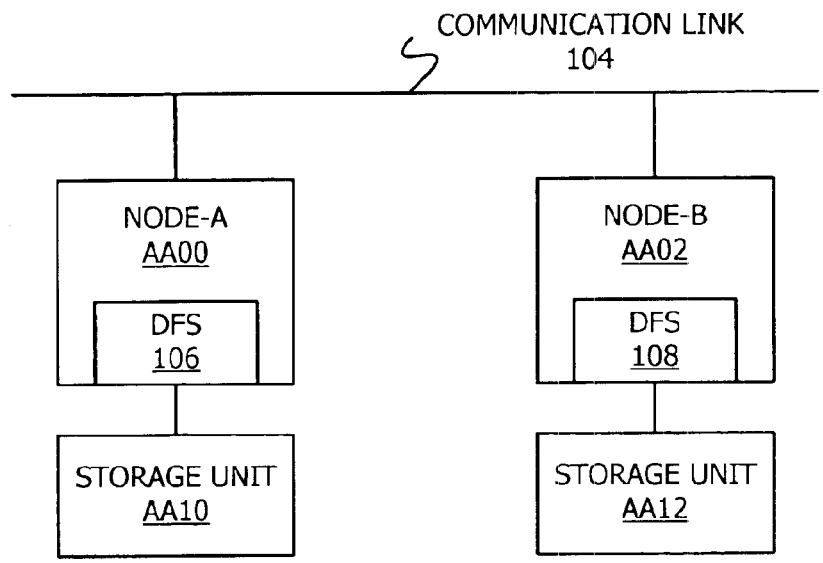
FIG. 1 shows an illustrative computer system employing prior art distributed file system technology.
Figure 2:
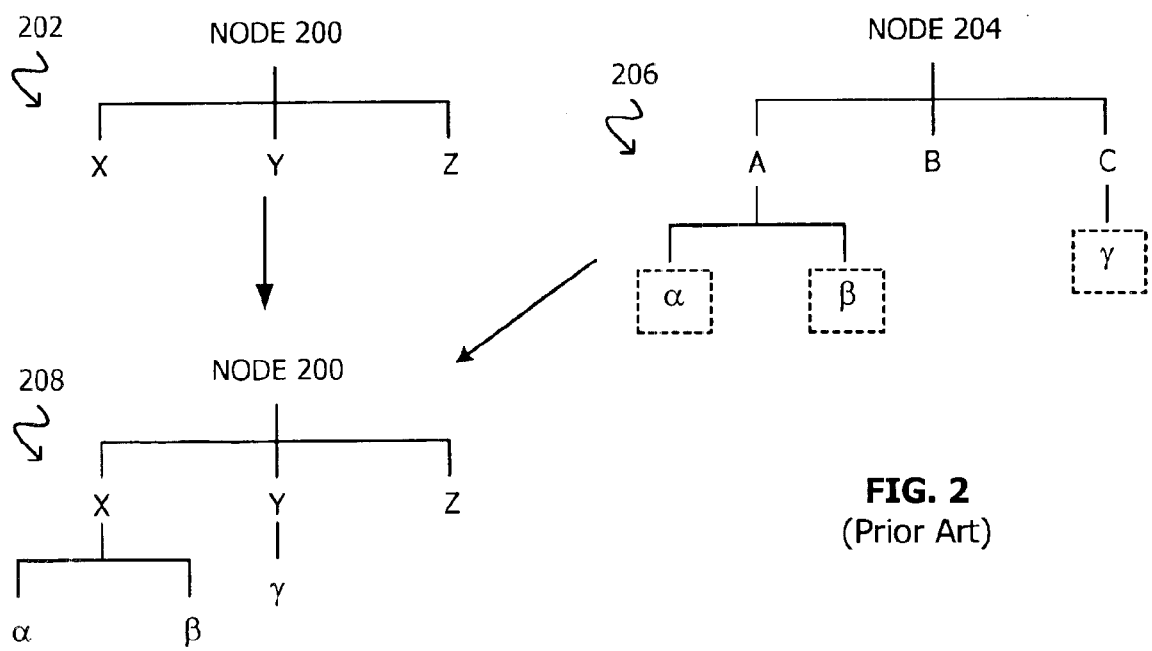
FIG. 2 illustrates how prior art distributed file systems manage shared storage.

Techniques (including methods and devices) to provide computer system storage are described. The following embodiments of the invention are illustrative only and are not to be considered limiting in any respect.

A computer system having distributed storage in accordance with one embodiment of the invention is shown in FIG. 3. As indicated, computer system 300 includes clients 302 and 304, communication network 306, memory translators (MXs) 308 and 310, input-output managers (IOMs) 312, 314, 316, 318, and 320, and storage media 322. In addition, each MX 308 and 310, and each IOM 312 through 320 has an associated data store, 324 through 336.

Clients 302 and 304 generate/initiate memory access transactions such as object creation, object read, object write, and object delete operations. The term "object," as used herein, refers to any entity which may be assigned and accessed by a memory label (e.g., a filename). One illustrative object is a file object which may be defined as of a sequential array of records. Another illustrative object is a directory object which may be defined as of an ordered collection of records. In one embodiment, a directory may be a B-tree of records, the collection of all such records representing a global directory which may be physically stored on one or more storage devices. In one embodiment, a system directory (organized as a single file) is redundantly distributed across multiple storage devices. While the size of a record may be variable, a data file record is typically one byte (i.e., byte addressable) and a directory record is typically the size needed to store that information associated with a directory node (e.g., 1000 bytes). Communication network 306 serves to interconnect the various system components. Illustrative communication networks may use any available protocol (e.g., the transport control protocol) and may be implemented using any suitable technology such as copper wire, infrared, fiber optic, microwave, or satellite communication technologies. Storage media 322 may include one or more storage devices such as, for example, magnetic disks (fixed, floppy, and removable) and optical media such as CD-ROM disks.

Memory translators provide, among other things, two capabilities. First, each MX translates memory access commands between a client protocol, such as that used by an NFS® or Windows NT® based client, and a format that may be processed by one or more input-output managers. In this sense, a MX represents a client's point of access to system memory space embodied in storage media 322. In one embodiment, there may be as many MXs as there are types of client file systems. Second, each MX may obtain and/or retain an object's referential map. A referential map describes the association between an object and those input-output managers at which at least a portion of the object is stored. Thus, input-output managers represent logical storage units over which an object is distributed. (An object's master or primary referential map is maintained as part of the object's directory entry.) In one embodiment, a MX may retain an object's referential map (to the extent possible in data storage 324 or 330, for example) if it performed a lookup operation on the object's label for a client (i.e., a filename to handle translation). In another embodiment, only that MX associated with an input-output manager storing an object's initial portion (e.g., an object's "start of file") retains the object's referential map. The former embodiment may be more efficient when only a single client can access an object at a time. The latter embodiment may be more efficient when more than one client may access an object at once.

In general, referential maps may be generated in accordance with any desired mapping function. In one embodiment, the referential mapping function may rely on the sequential identification of input-output managers in a striping fashion. Referential mapping information of this type may include: (1) identification of that input-output manager at which the object's first record is stored; (2) the number of input-output managers over which the object is distributed, referred to as the object's span; (3) indication of the lowest numbered input-output manager at which any portion of the object is stored; and (4) the quantum (e.g., number of bytes) of the object stored at each input-output manager. In another embodiment, the referential mapping function may be an explicit identification of those input-output managers at which at least a portion of an object is stored. Referential mapping information of this type may include: (1) identification of each input-output manager on which at least a portion of an object is stored; and (2) the quantum of the object stored at each of the identified input-output managers.

FIG. 4 illustrates the first technique in which object A 400 (being 6× bytes in length) is striped across four of a system's five input-output managers (IOM-2 404 through IOM-5 410) in quantums of X bytes, beginning at IOM-2 404. In this example, object A's starter input-output manager is IOM-3 406 object A's span is 4; the lowest numbered input-output manager at which at least a portion of object A 400 is stored is IOM-2 404; and object A 400 is stored in quanta of X bytes. (Note, object A does not need to be an even multiple of X.)

It is significant to note that referential maps do not incorporate information specifying an object's physical storage location. That is, a MX does not have knowledge of or access to information describing how and where any portion of an object is physically stored. In contrast, prior art distributed filesystem command protocol translators (e.g., elements 106 and 108 in FIG. 1) generate and maintain mappings between an object's label (e.g., filename), the associated object reference (e.g., handle), and the physical storage locations allocated to the object. Because of this linkage between an object and its physical storage location at the file command transistor level, prior art file systems do not distribute an object across a plurality of processors (that is, physical memory managed by two or more processes executing on two or more processors).

Figure 5:
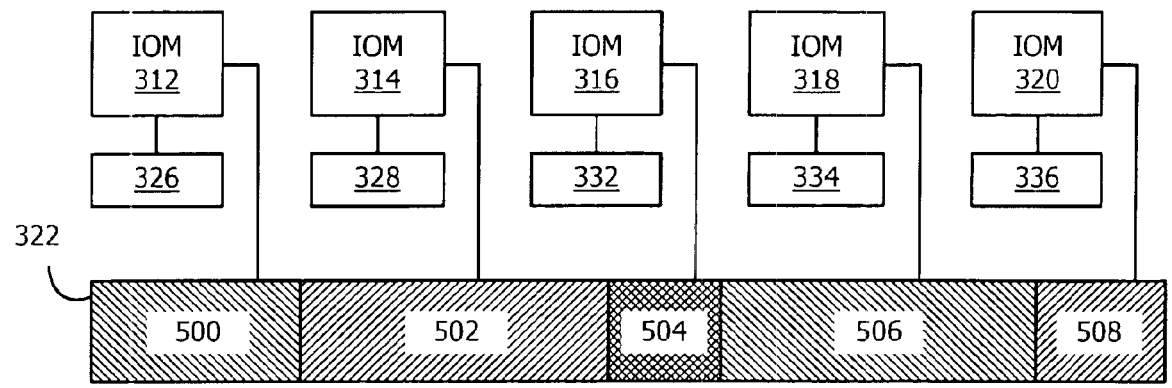
FIG. 5 shows how input-output managers may be mapped to various portions of system storage media in accordance with one embodiment of the invention.

Input-output managers manage a specified portion of system memory embodied in storage media 322. Referring to FIG. 5 for example, IOM 312 may manage memory space 500, IOM 314 may manage memory space 502, and so forth. Each of memory spaces 500 through 508 may span one or more physical storage devices, portions of one or more physical storage devices, or any combination thereof. As additional memory (i.e., storage devices) is added to computer system 300, the new memory may be managed by one or more existing IOMs, one or more additional IOMs, or any combination of new and existing IOMs.

More specifically, IOMs manage the storage of portions of objects to physical memory. To this end, each IOM generates and maintains physical maps. A physical map describes the association between at least a portion of an object managed by an IOM and the physical memory allocated to the those object portions by the IOM. In addition, if an IOM manages the physical storage of only a portion of an object, the IOM may generate and maintain information identifying those IOMs which manage the object's other portions. This latter information may be used by IOMs to facilitate the storage, retrieval, and manipulation of objects distributed across multiple IOMs. It is significant that an IOM generates and maintains physical maps for only those portions of objects for which it manages physical storage.

Partitioning an object's storage access information into independent referential and physical maps in accordance with the invention provides many significant benefits. One benefit is that referential maps may be generated at object creation time and thereafter left unchanged. The unchanging nature of referential maps make them an ideal type of information to globally distribute (e.g., to all clients). Another benefit of separating storage access information into referential maps and physical maps allows the details of an object's physical storage (i.e., its location) to be completely disassociated from the object's addressability via its label or handle. This, in turn, may provide clients with a unified view of system namespace; clients may access an object through a constant and consistent reference without the need (or ability) to know where or how an object is physically stored. Yet another benefit of separate referential and physical maps in accordance with the invention is that each IOM maintains only those physical maps for those portions of objects for which it manages physical memory. Because different IOMs may be associated with—or executed by—different processors, separation of storage access information into referential maps and physical maps provides a mechanism to distribute objects across multiple processors. The ability to distribute objects across multiple processors, in turn, may contribute significantly to the expandability of a distributed storage system in accordance with the invention. Distribution of objects across multiple processors also allows each portion of an object to be accessed independently of any other portion of an object.

Figure 6:
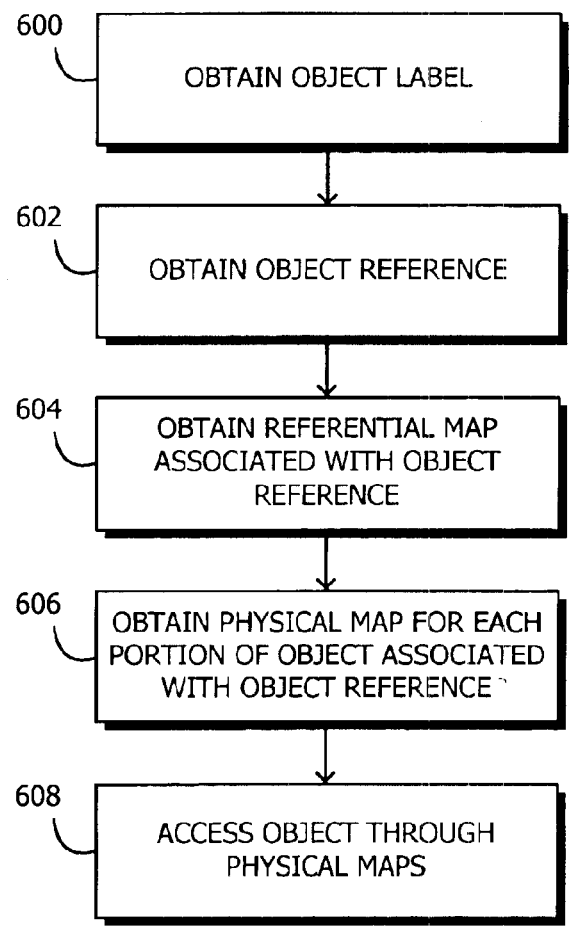
FIG. 6 shows a memory access method in accordance with one embodiment of the invention.

A method to access an object using referential and physical maps in accordance with one embodiment of the invention is illustrated in FIG. 6. Initially an object's label or filename is obtained (block 600) and translated to an object reference or handle in any convenient manner (block 602). (Label to reference translation is often referred to as a "lookup" operation). Having obtained an object's handle, the object's referential map is obtained (block 604). An object's referential map may generally be one element of that object's directory entry so that a directory lookup on an object's handle retrieves that object's referential map. As characterized above, a referential map describes how an object is distributed to one or more IOMs, where each of the one or more IOMs is responsible for managing the physical storage for a part of the object. No information regarding the physical storage characteristics of an object is included in a referential map.

Having identified those IOMs associated with an object, the physical maps for each of the object's distributed portions may be obtained (block 606). Specifically, one or more physical maps may be obtained from each of the IOMs identified in the object's referential map. Access to each portion of an object is then provided by an IOM in accordance with the physical map associated with that IOM (block 608).

It will be recognized that less than an entire object may be accessed. For example, the $n^{th}$ 32 kilobyte block of an object may be accessed by: identifying one or more IOMs responsible for the physical storage of the $n^{th}$ 32 kilobyte block (via the referential map obtained during the acts of block 604); retrieving the relevant physical maps; and accessing physical memory in accordance with those physical maps.

Figure 7A:
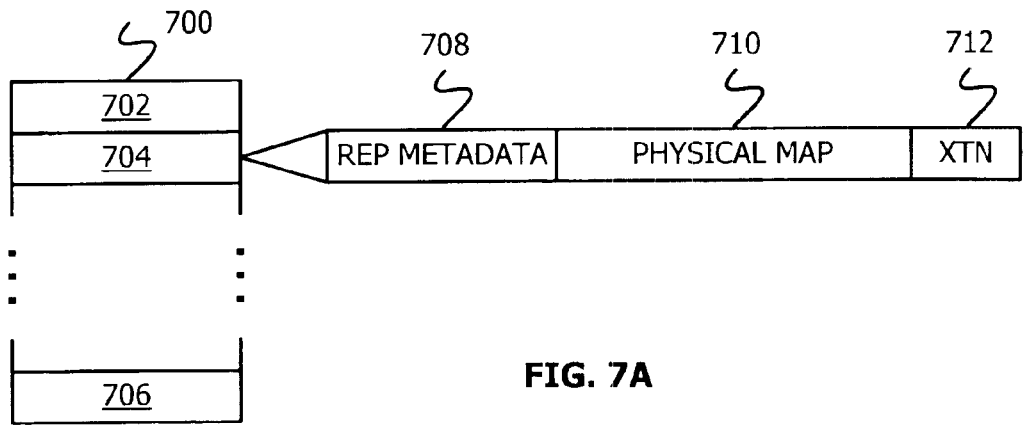
FIGS. 7A, 7B, and 7C illustrate object metadata structures that an input-output manager may use to identify an object's physical map in accordance with one embodiment of the invention.
Figure 7B:
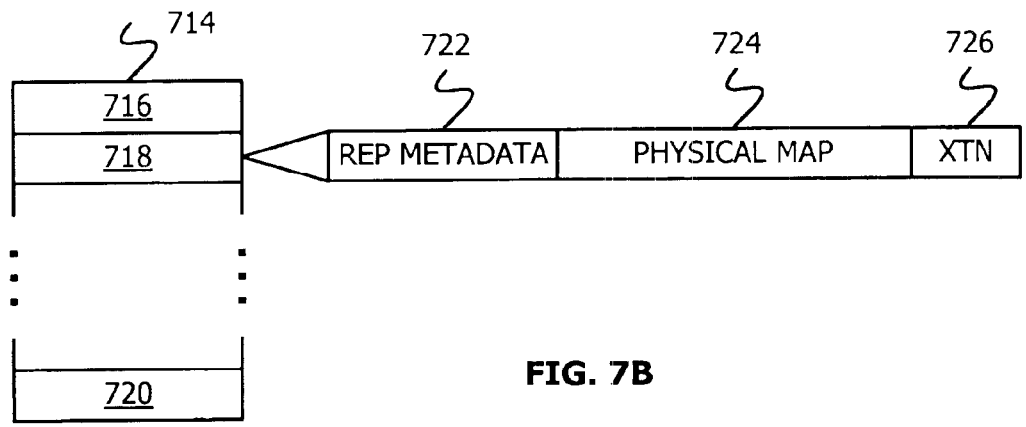

One mechanism by which an IOM may translate an object's reference to a physical map uses a handle that provides an indication of the objects starter IOM and an index into the starter IOM's primary object metadata. An object's starter IOM is that IOM at which the object's initial portion (e.g., an object's "start of file") is stored. For example, if object A is distributed across IOMs 1 through 5, and the first quantum of object A is physically located in memory allocated and controlled/managed by IOM-3, then IOM-3 is said to 'be object A's starter IOM. An IOM's primary object metadata associates an object's handle with a physical map. An IOM maintains primary object metadata for only those objects (or portions of objects) stored in memory allocated to and managed by the IOM. Each IOM also maintains secondary object metadata for those objects (or portions of objects) stored in memory allocated to and managed by the IOM but for which it is not the starter IOM. Primary and secondary metadata may be retained in data stores associated with each IOM (e.g., component 326 in FIG. 3) which may include volatile and/or non-volatile memory. In one embodiment, each IOM maintains primary and secondary object metadata in table form as shown in FIGS. 7A and 7B.

Each IOM's primary object metadata table 700 includes one entry (e.g., 702, 704, and 706) for each object for which it is the starter IOM. Typically, each entry in primary metadata table 700 is a fixed size, and includes replicated metadata field 708, physical map field 710, and extension field 712. Replicated metadata field 708 includes a copy of an object's referential map information. Physical map field 710 associates each object with one or more physical storage blocks on a storage device. Thus, each physical map may itself include multiple entries. Extension field 712 indicates if an object's physical map exceeds a length allowed by the size of physical map field 710. For example, extension field 712 may be assigned a null or zero value if all of an object's physical storage (managed by an IOM) may be indicated within the space allocated to physical map field 710. If, however, an object's physical map requires more storage block indications than may be included in fixed size physical map entry 710, extension field 712 may indicate a file in which the object's physical map is continued.

Each IOM's secondary object metadata table 714 includes one entry (e.g., 716, 718, and 720) for each object for which it manages physical memory associated with the object (or part thereof) and for which it is not the starter IOM. Each entry in secondary object metadata table 714 includes the same information as does an entry in the primary metadata table 700: replicated metadata field 722; physical map field 724; and extension field 726.

Figure 7C:
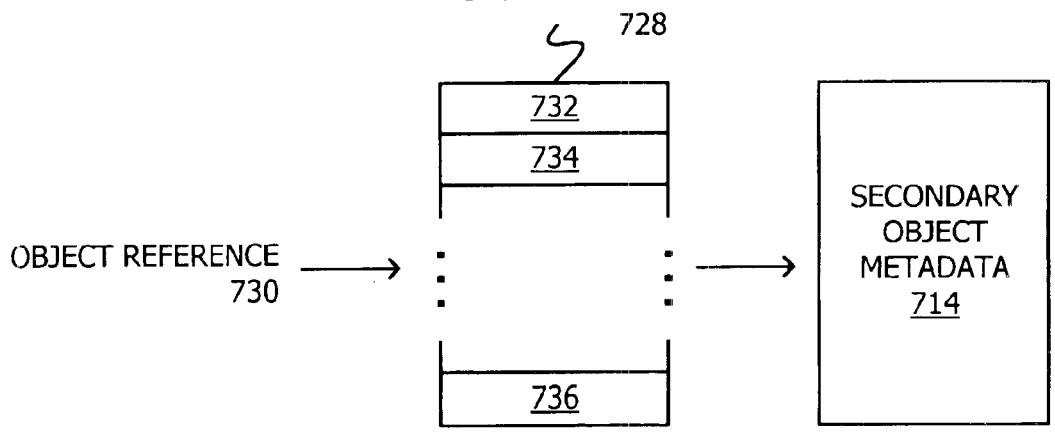

Referring to FIG. 7C, each IOM also maintains a secondary object hash structure 728 to facilitate object reference to secondary object metadata table lookup. As noted above, an object's unique reference or handle provides an indication of the object's starter IOM and index into the starter IOM's primary object metadata 700. Thus, if an IOM is not an object's starter IOM, the object's reference 730 provides no direct indication of where the object's physical map is located. By hashing on object reference 730, a unique entry in secondary object hash structure 728 may be determined (e.g., 732, 734, and 736) which, in turn, identifies a unique entry and physical map in secondary object metadata 714. In one embodiment secondary hash structure 728 may be implemented as a B-tree. In another embodiment, secondary hash structure 728 may be implemented as a link-list structure. In yet another embodiment, secondary hash structure 728 may be implemented as a dynamically resizable array.

Figure 8:
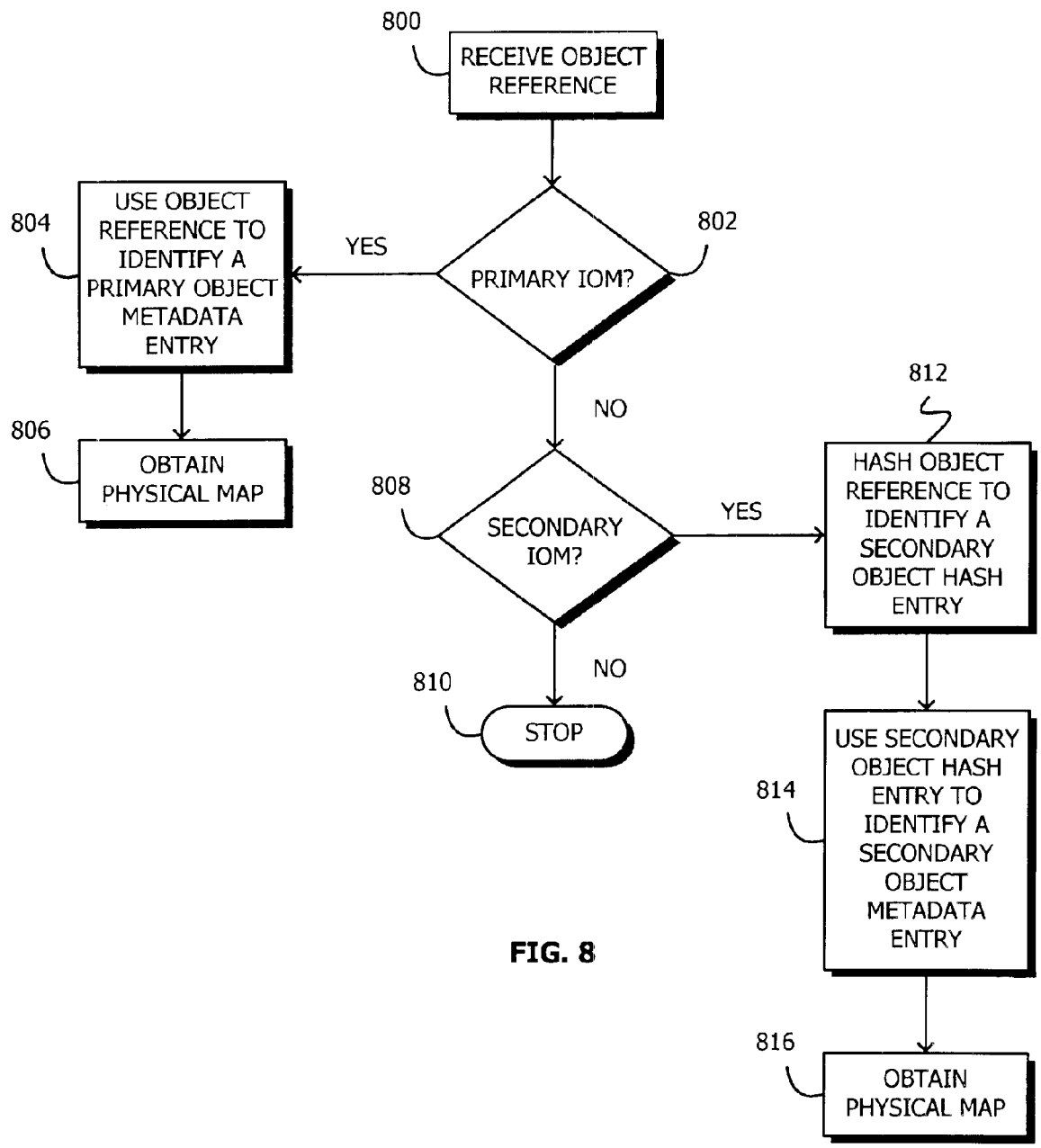
FIG. 8 illustrates a method in accordance with one embodiment of the invention by which an input-output manager identifies a physical map using the metadata structures of FIGS. 7A, 7B and 7C.

A technique in accordance with one embodiment of the invention by which an IOM identifies a physical map using the metadata structures of FIGS. 7A, 7B and 7C is shown in FIG. 8. First, the IOM receives an object reference or handle (block 800). If the IOM is the object's primary IOM (the "yes" prong of diamond 802), the object reference is used to directly identify an entry in the IOM's primary object metadata (block 804). The relevant physical map may then be obtained from the identified metadata entry (block 806). If the IOM is not the object's primary IOM (the "no" prong of diamond 802), and the IOM is not a secondary IOM for the object (the "no" prong of diamond 808), processing may stop as the IOM has no information regarding the object (block 810). If the IOM is a secondary IOM for the object (the "yes" prong of diamond 808), the object reference is hashed to identify a secondary object hash entry (block 812). Based on the identified secondary object hash entry, an entry in the secondary object metadata is identified (block 814). The relevant physical map may then be obtained from the identified metadata entry (block 816).

Figure 9:
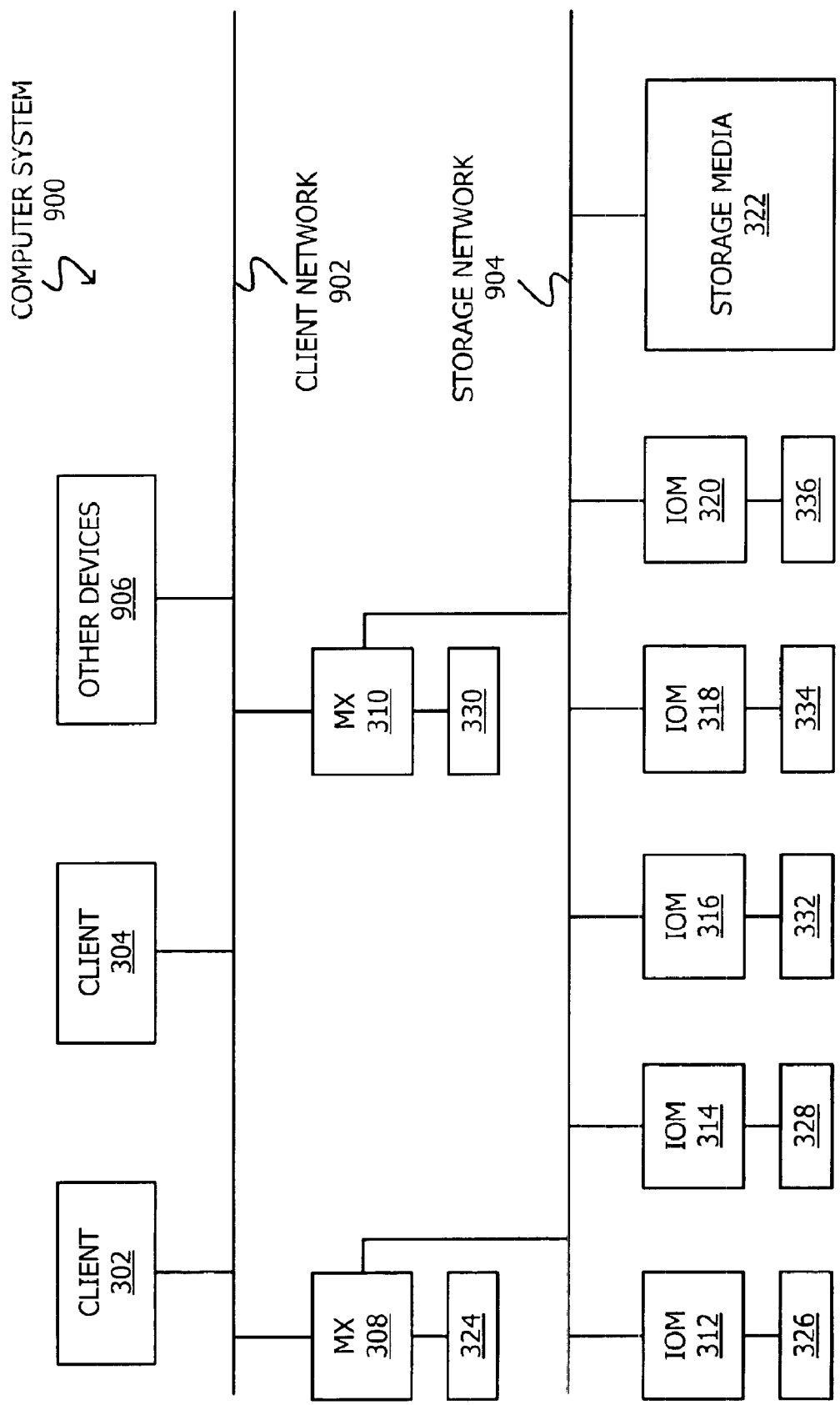
FIG. 9 shows an alternative embodiment for a computer system having distributed system storage.

It will be recognized that a computer system to provide distributed system is storage in accordance with the invention may be implemented via architectures different from that shown in FIG. 3. For example, FIG. 9 shows an alternative computer system 900 that employs two networks: client communication network 902 and storage communication network 904. In this embodiment, client data traffic is segregated from storage system data traffic. That is, each client may communicate with another client, a MX, or another device 906 (e.g., a printer device) without interrupting or being interrupted by data transfer operations between one or more IOMs. It will be further recognized that each of client network 902 and storage network 904 may include one or more physical networks and may, furthermore, be implemented using any desired technology. In addition, the implementation of client network 902 and storage network 904 may be independent of one another.

Figure 10:
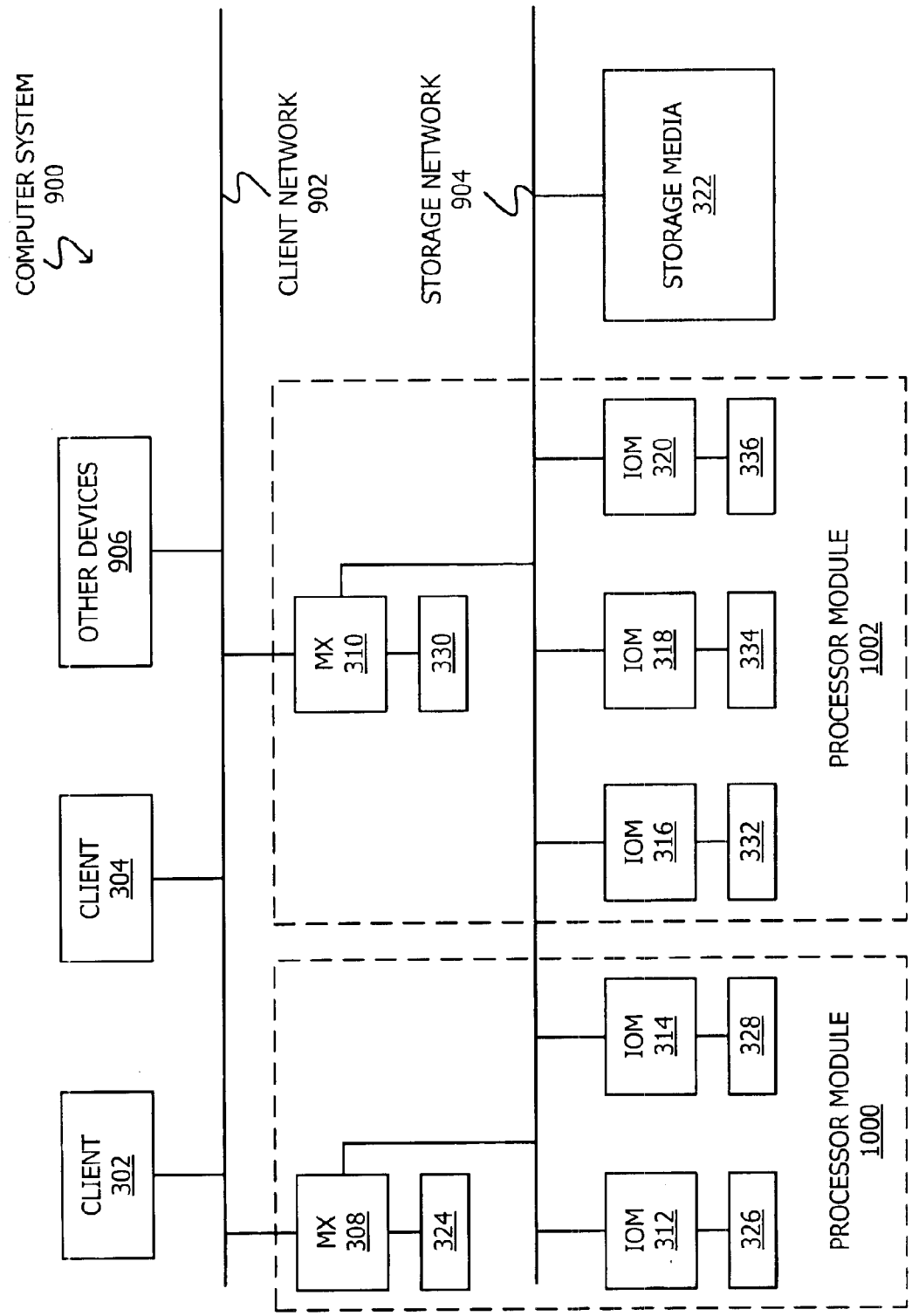
FIG. 10 shows a hardware partitioning of the computer system of FIG. 9 in accordance with one embodiment of the invention.

Typically, MX and/or IOMs may be embodied in one or more program modules or routines for execution by a programmable control device. Illustrative programmable control devices include a single computer processor, a plurality of computer processors coupled by one or more communication links, or a custom designed state machine. Custom designed state machines may be embodied in a hardware device such as a printed circuit board comprising discrete logic, integrated circuits, specially designed application specific integrated circuits (ASICs), or field programmable gate arrays. Referring to FIG. 10, the computer system of FIG. 9 is shown as including processor modules 1000 and 1002 as well as client devices 302, 304, other devices 904, and storage media 322. Each of processor modules 1000 and 1002 includes at least one programmable control device which is designed to execute MX and IOM routines. In a similar manner, each client 302 and 304 may be an independent computer system such as, for example, special or general purpose workstations including multiprocessing systems.

Various changes in the materials, components, circuit elements, as well as in the details of the illustrated operational methods are possible without departing from the scope of the claims. For instance, the illustrative computer systems of FIGS. 3, 9 and 10 may be physically embodied in a single unit or distributed to two or more units. Each unit may include one or more programmable control devices such as microcontrollers or processors. In addition, acts in accordance with FIGS. 6 and 8 may be performed by one or more programmable control devices executing instructions organized into program modules. Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to access an object in a computer system storage, comprising the operations of:

receiving a reference to the object;

obtaining a referential map based on the reference, the referential map indicating a plurality of logical storage locations, each of the indicated plurality of logical storage locations being associated with at least one portion of the object and being that logical storage location at which the associated at least one portion of the object is stored, the indicated plurality of logical storage locations being all of the logical storage locations that are associated with at least one portion of the object; and obtaining a physical map directly from one of the logical storage locations indicated in the referential map, the physical map being independent of the referential map, the physical map indicating a physical storage location for that at least one portion of the object that is associated with a particular one of the logical storage locations;

wherein the referential map does not map to the physical storage location.

2. The method of claim 1, further comprising the operation of:

accessing the associated portion of the object at the indicated physical storage location.

3. The method of claim 2, wherein the act of accessing comprises accessing one or more records associated with the associated portion of the object.

4. The method of claim 3, wherein the act of accessing one or more records comprises accessing one or more sequential bytes in the computer memory.

5. The method of claim 3, wherein the act of accessing one or more records comprises accessing one or more records in an ordered data structure.

6. A program storage device, readable by a programmable control device, the program storage device comprising:
instructions stored on the program storage device for causing the programmable control device to:
receive a reference to an object, the object having a plurality of portions, each of the portions being storable at a different one of a plurality of logical storage locations;
obtain a referential map based on the reference, the referential map indicating all of the plurality of logical storage locations at which at least one of the portions of the object is located, each of the indicated plurality of logical storage locations being associated with at least one of the portions of the object and being that logical storage location at which the associated at least one of the portions of the object is stored; and
obtain a physical map directly from one of the logical storage locations indicated in the referential map, the physical map being independent of the referential map, the physical map indicating a physical storage location for only that portion or only those portions of the object that are associated with the one logical storage location;
wherein the referential map does not map to the physical storage location.

7. The program storage device of claim 6, further comprising instructions to access the associated at least one of the portions of the object at the indicated physical storage location.

8. The program storage device of claim 7, wherein the instructions to access comprise instructions to access one or more records associated with the object.

9. The program storage device of claim 8, wherein the instructions to access one or more records comprise instructions to access one or more sequential bytes in a computer memory.

10. The program storage device of claim 6, wherein the instructions to obtain a referential map comprise instructions to perform a directory lookup operation on the object reference.

11. The program storage device of claim 6, wherein the instructions to obtain a physical map comprise instructions to:
select one of the plurality of logical storage locations from which to access one of the portions of the object; and
identify a physical map directly from the object reference if the selected logical storage location manages physical memory associated with an initial record of the object.

12. The program storage device of claim 11, wherein the instructions to identify a physical map directly from the object reference comprise instructions to identify an entry in a primary object metadata structure.

13. The program storage device of claim 11, further comprising instructions to identify a physical map based on a secondary lookup of the object reference if the selected logical storage location does not manage physical memory associated with the initial record of the object.

14. A computer storage system, comprising:
a communication link;
a client operatively coupled to the communication link;
a memory translator, operatively coupled to the communication link, adapted to receive a memory access command from the client and to store one or more referential maps, each memory access command being a request to access an object, each referential map indicating a plurality of logical storage locations, each of the indicated plurality of logical storage locations being associated with a portion of the object and being that logical storage location at which the associated portion of the object is stored; and
a plurality of logical storage locations, operatively coupled to the memory translator and adapted to store physical maps independent of the one or more referential maps, each physical map indicating one or more physical locations where at least a portion of the object is physically stored;
wherein the one or more referential maps do not map to the one or more physical locations.

15. The computer storage system of claim 14, wherein a first of the plurality of logical storage locations is associated with a first processor and a second of the plurality of logical storage locations is associated with a second processor such that the portions of the object are distributed across the first and second processors.

16. The computer storage system of claim 14, wherein each of the plurality of logical storage locations is associated with one or more physical storage devices.

17. The computer storage system of claim 14, wherein the client comprises a software application being executed by a client processor.

18. The computer storage system of claim 14, wherein a logical storage location further comprises:
a primary object metadata structure; and
a secondary object metadata structure.

19. A method for providing access to objects from a computer system storage in which the objects are stored, the access to be provided in response to a reference to one of the objects, the method comprising the operations of:
maintaining a referential map corresponding to the reference, the referential map indicating a plurality of input-output managers, at each of the plurality of input-output managers less than the entire object is to be stored; and
also maintaining in one particular input-output manager only one or more physical maps as is or are for the particular portion or portions of the object for which the one particular input-output manager manages physical storage locations, each of the one or more physical maps indicating a physical storage location for the respective particular portion(s) of the object that corresponds to the less than the entire object and that is associated with the respective one particular input-output manager;
wherein the referential map does not map to the physical storage locations.

20. A method as recited in claim 19, further comprising the operation of accessing one particular portion of the object by using the one particular input-output manager that manages physical storage locations for the one particular portion of the object to which the reference related, to indicate the physical storage location that stores that one particular portion of the object.

21. The method of claim 19, wherein the also maintaining operation further comprises the operations of:
defining an initial one of the portions of the one of the objects; and defining the one of the input-output managers that stores the initial one of the portions of the one of the objects, as a starter input-output manager;

the reference to the one of the objects providing an indication of the starter input-output manager and an index into the object metadata of the starter input-output manager.

22. A method of accessing a file object in a computer system storage, the file object being in the form of a sequential array of records, the method comprising the operations of:

receiving a reference to the file object;

obtaining a referential map based on the reference, the referential map indicating a plurality of logical storage locations, the plurality of logical storage locations being all of the locations associated with at least one portion of the file object, and each of the plurality of logical storage locations being associated with at least one portion of the file object and being that logical storage location at which the associated at least one portion of the file object is stored; and obtaining a physical map directly from one of the logical storage locations indicated in the referential map, the physical map being independent of the referential map, the physical map indicating a physical storage location for that at least one portion of the file object that is associated with a particular one of the logical storage locations;

wherein the referential map does not incorporate any information specifying the physical storage location of any portion of the file object.

23. A program storage device, readable by a programmable control device, the program storage device comprising:

instructions stored on the program storage device for causing the programmable control device to:

receive a reference to an object, the object being a sequential array of records and having a plurality of portions, each of the portions being storable at a different one of a plurality of logical storage locations;

obtain a referential map based on the reference, the referential map indicating all of the plurality of logical storage locations at which all of the portions of the object are located; each of the indicated plurality of logical storage locations being associated with at least one of the portions of the object and being that logical storage location at which the associated at least one of the portions of the object is stored; and obtain a physical map directly from one of the logical storage locations indicated in the referential map, the physical map being independent of the referential map, the physical map indicating a physical storage location for only that portion or only those portions of the object that are associated with the one logical storage location;

wherein the referential map does not incorporate any information specifying the physical storage location of any portion of the object.

24. A computer storage system, comprising:

a communication link;

a client operatively coupled to the communication link;

a memory translator, operatively coupled to the communication link, adapted to receive a memory access command from the client and to store one or more referential maps, each memory access command being a request to access an object, the object comprising a sequential array of records, each referential map indicating a plurality of logical storage locations, each of the indicated plurality of logical storage locations being associated with a portion of the object and being that logical storage location at which the associated portion of the object is stored, the memory translator not having knowledge or access to information describing any of the physical storage locations; and a plurality of logical storage locations, operatively coupled to the memory translator and adapted to store physical maps independent of the one or more referential maps, each physical map indicating one or more physical locations where at least a portion of the object is physically stored, wherein none of the one or more referential maps has information specifying any of the physical locations where at least a portion of the object is physically stored.

25. The computer storage system of claim 24, wherein a first of the plurality of logical storage locations is associated with a first processor and a second of the plurality of logical storage locations is associated with a second processor such that the portions of the object are distributed across the first and second processors.

26. A method for providing access to a file object from a computer system storage in which the file object is stored, the file object comprising a sequential array of records, the access to be provided in response to a reference to the file object, the method comprising the operations of:

maintaining a referential map corresponding to the reference to the file object, the referential map indicating a plurality of input-output managers, each of the plurality of input-output managers being configured to store a portion or portions of the file object, the portion and portions each being less than the entire file that is to be stored; and also maintaining in one particular input-output manager only one or more physical maps as is or are for the particular portion or portions of the file object for which the one particular input-output manager manages physical storage locations, each of the one or more physical maps indicating a physical storage location for the respective particular portion(s) of the file object that corresponds to the less than the entire file object and that is associated with the respective one particular input-output manager;

wherein the referential map does not incorporate information specifying any physical storage location of any portion of the file object.

* * * * *